Patented Jan. 3, 1933

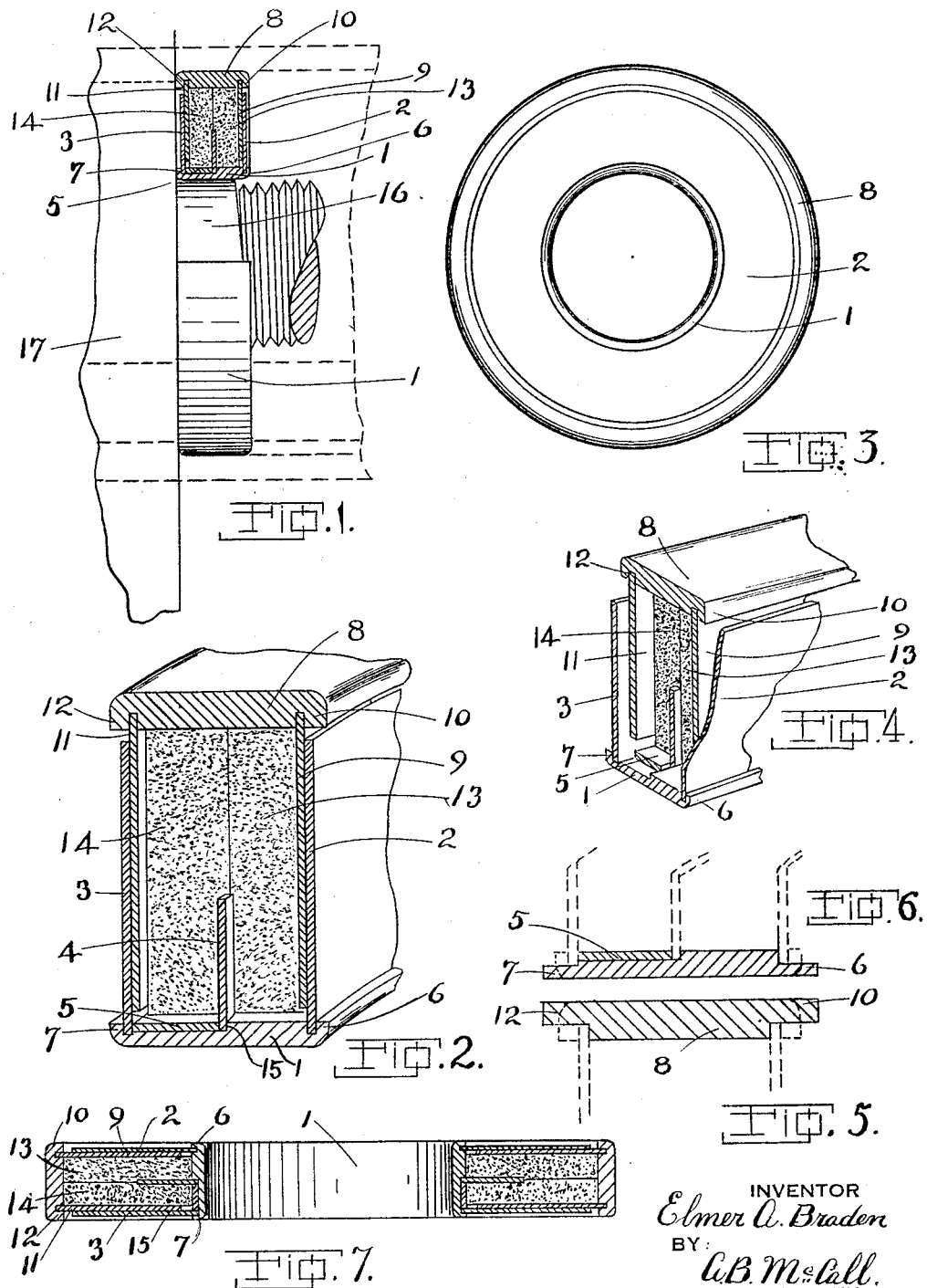

1,893,012

UNITED STATES PATENT OFFICE

ELMER A. BRADEN, OF SPRINGFIELD, ILLINOIS

SELF CONTAINED OIL SEAL

Application filed June 3, 1930. Serial No. 459,046.

My invention relates to oil seals or packing rings for retaining oil about a bearing or boxing; an object being in this device to provide a substantial, practical, economical, and simply constructed self contained oil seal.

A further object of my invention is to provide a self contained oil seal having an inner and outer channeled ring with an oil seal element between them so as to protect a bearing or wheel shaft or the like from oil losses and to prevent admitting foreign substances to the bearing such as might be injurious to a journal or spindle or pulley or wheel mounted thereon.

A further object of my invention is to provide a self contained oil seal as an improvement over my own invention for which application for patent was filed in the United States Patent Office November 9, 1929, Serial Number 406,146 including such new and novel improvements in design as will enable those skilled in the manufacture thereof to produce the same with no difficult operations on a quantity production basis.

I attain the objects of my invention in the device described in the annexed specifications, recited in the claims, and illustrated in the accompanying drawing, in which like reference numerals indicate like parts in the several figures.

Referring to the figures:

Figure 1 is a side elevation in partial cross section showing my self contained oil seal as when mounted on a shaft or spindle to prevent oil losses and guard against dirty bearings.

Figure 2 is an enlarged detail of a cross section and partial perspective of my improved self contained oil seal.

Figure 3 is a circular or end view of my device shown alone.

Figure 4 is a perspective showing in a cutaway further details of the construction of my device.

Figure 5 is a detail of the outer ring which holds two of the fixed washer members or side plates of the seal.

Figure 6 is a detail of the inner ring adapted to support the central as well as the two outer rotating washers and shown in a manner wherein it is not yet rolled on the edges to engage the outer side pieces.

Figure 7 is a cross section of my oil seal.

Referring in detail to the construction of my improved device and to the preferred method of applying and using the same, I provide an inner ring —1— adapted to engage an outer washer —2— on one side and an outer washer —3— on the other.

Between washers —2— and —3— I provide a central washer —4— held in place by a spring band —5— resiliently engaging ring —1— in its normal fitting position between washers —3— and —4—.

Rolled edge —6— of ring —1— engages washer —2— while rolled edge —7— of ring —1— engages washer —3—.

Ring —1— is shown in Figure 6 as it would appear before being rolled on the edges —6— and —7—.

Outer ring —8— engages washer —9— on one side by rolled edge —10— and engages washer —11— by rolled edge —12—.

Members —13— and —14— are used in my self contained oil seal as oil seal elements. These two oil seal elements may be felt or any other suitable material that may be effective as an oil seal.

In the assembly of my oil seal I find that there is a particular advantage found in the processes of manufacture which permit quick and easy operations resulting in saving of time and labor.

Rings —1— and —8— may be made of tubular material or welded rings or pressed rings.

In building up the oil seal of my invention I first prefer to roll washer —2— in place securely where it is engaged by rolled edge —6—. At the same time washer —9— may be secured to ring —8— by rolled edge —10—. When this much is done washer —9— is slipped over ring —1— into operative position with ring —8— so that washer —9— will come next to washer —2—.

Oil seal element —13— is then slipped over ring —1— after which ring —4— is slipped over ring —1— to rest against shoulder —15— of ring —1—.

When ring —4— is in place then sleeve

—5— is firmly fitted about ring —1— so as to firmly engage ring —1— and hold washer —4— in place on ring —1—.

Oil seal element —14— is then slipped over sleeve —5—.

Washer —11— is then rolled into fitting position on ring —8— in contact with oil seal element —14— to hold it in place.

As a final operation washer —3— is then rolled into position by rolled edge —7— of ring —1—.

It will be observed in the construction of my self contained oil seal that I am providing an inner and an outer channeled ring with an oil seal element between them, also side washers adapted to operatively engage the oil seal elements to keep them in place.

For instance ring —1— is adapted to fit snugly about a spindle —16— where it is held in fixed position together with those washers that are secured thereto, wherever the spindle is relatively stationary and a wheel or pulley is adapted to rotate thereon. In this situation oil seal elements —13— and —14—, washers —9— and —11— and outer ring —8— would all turn with the wheel or pulley which rotates on spindle —16—.

However in cases where a shaft or journal turns in a bearing or boxing the outer ring —8— is snugly seated into relatively fixed position on the boxing or bearing in proper position to hold the oil in place on the contacting members. In this situation ring —8—, washers —9— and —11— and oil seal elements —13— and —14— are all held into relatively fixed position and ring —1— being secured to the rotating journal or shaft washers —2— and —3—, sleeve —5— and central washer —4— will all rotate with the turning journal or shaft.

In the detail study of the construction on my self contained oil seal it will be noted that when inner ring —1— rotates with its attached washers all turning with the journal or shaft —16— within a boxing or bearing —17— will tend to cause washers —2— and —3— to act as slingers and the centrifugal force will thus tend to prevent oil from leaking out or dirt from entering the oil compartment.

A doubly effective check against the loss of oil from, and the admission of dirt to the oil chamber is found in the construction of my oil seal where central washer —4— tends to prevent oil from passing through from one side of the seal to the other under oil seal elements —13— and —14—, since this washer not only blocks the passage of oil from one side to the other by tight fitting relation with ring —1—, but when it rotates with ring —1— the centrifugal force of its rotation will tend to prevent oil from passing up over ring —1— and back again on the other side.

It will thus be seen that I provide in this improved self contained oil seal a very effective protection for rotating journals or shafts supported by boxings or bearings or rotating wheels or pulleys supported on relatively fixed spindles.

Having thus described the nature of my invention what I claim is:

1. A self contained oil seal comprising in combination an inner and an outer channeled ring disposed in annular concentric alignment; said outer ring engaging a pair of annular end plates within annular channels thereof; said inner ring provided with a pair of annular end plates engaged within annular outer channels thereof; a central annular plate encompassing said inner ring and engaged by a sleeve encompassing said inner ring and an annular oil seal element encompassing said inner ring between said end plates and engaging said central plate thereof; said end plates of said outer ring snugly engaging said oil seal element and flanked by said end plates of said inner ring, either of said rings with their engaged end plates adapted to rotate on their common center when the other is held in fixed position when in normal operation.

2. A self contained oil seal comprising an inner and an outer channeled ring, a pair of annular flanking plates secured to each of said rings; said plates of the inner ring flanking the plates of the outer ring and an annular oil seal element engaged and encompassed by said flanking plates of said rings, a central washer member secured to said inner ring and held in place by a sleeve engaging said inner ring; said annular oil seal element encompassing and flanking said central washer member; said self contained oil seal adapted to protect bearings, journals, spindles, boxings and the like against dirt entering, and the loss of oil therefrom.

In witness whereof I hereby set my hand and seal this 31st day of May, 1930.

ELMER A. BRADEN.